(12) United States Patent
Eum et al.

(10) Patent No.: US 12,230,168 B2
(45) Date of Patent: Feb. 18, 2025

(54) FLEXIBLE DISPLAY DEVICE

(71) Applicant: LG Display Co., Ltd., Seoul (KR)

(72) Inventors: Hyo-Sup Eum, Seoul (KR); Myeongjun Kim, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/472,504

(22) Filed: Sep. 22, 2023

(65) Prior Publication Data

US 2024/0221543 A1    Jul. 4, 2024

(30) Foreign Application Priority Data

Dec. 28, 2022  (KR) .......................... 10-2022-0186553

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC ................................ G09F 9/301; G06F 1/1652
See application file for complete search history.

(56) References Cited

U.S. PATENT DOCUMENTS

2016/0352878 A1*  12/2016  Kim ...................... G06F 1/1626

* cited by examiner

*Primary Examiner* — Mary Ellen Bowman
(74) *Attorney, Agent, or Firm* — Fish & Richardson P.C.

(57) ABSTRACT

A flexible display device includes a display panel that includes at least one bending area bending about a bending axis, a frame supports a rear surface of the display panel, a plurality of guide parts fixed to a rear surface of the frame, a plurality of fixing parts are movably provided on the rear surface of the frame and selectively coupled to the plurality of guide parts, the length of a controller is variable depending on the state of bending of the display panel, and the controller is connected to the fixing parts to control movements of the fixing parts, when the fixing parts are coupled to the guide parts, the bent display panel is prevented from being unbent, and the bent state of the flexible display device is maintained without a separate mount for fixing the bent state.

20 Claims, 26 Drawing Sheets

FLEXIBLE DISPLAY DEVICE

CROSS-REFERENCE TO RELATED APPLICATION

This application claims the priority of Korean Patent Application No. 10-2022-0186553, filed on Dec. 28, 2022, which is hereby incorporated by reference in its entirety.

BACKGROUND

Field of the Disclosure

The present disclosure relates to a flexible display device having a bendable structure.

Description of the Background

In general, flexible display devices may display intended images even when folded or rolled like a sheet of paper, due to pixels thereof being formed on a thin flexible substrate such as a plastic substrate. Thus, such flexible display devices are gaining attention as next-generation display devices, and research and development thereof are being undertaken.

Flexible display devices may include a flexible liquid crystal display device, a flexible plasma display device, a flexible organic light emitting display device, a flexible electrophoretic display device, a flexible electro-wetting display device, and the like.

An organic light-emitting display device, in particular, among such flexible display devices is gaining attention as a next-generation display device, due to a high response rate of 1 us or less, low power consumption, and self-illuminating ability.

FIG. 1 is a perspective diagram illustrating a typical flexible display device. Referring to FIG. 1, a flexible display device 1 may be bent about a bending axis BX. However, the bending may be only realized in designed positions, and it may be difficult to realize the bending as intended by a user in positions other than the designed positions. In addition, when the flexible display is bent, it may be difficult to maintain the bent shape. Thus, mounts 11 are required to be provided separately to prevent the flexible display from being unbent.

SUMMARY

Accordingly, the present disclosure is directed to a flexible display device that substantially obviates one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a flexible display device that may be bent at positions desired by a user and maintain the bent state without mounts.

The present disclosure is also to provide a flexible display device that may be freely bent and arched (or curved) as intended by the user, thereby improving the practicability and satisfaction of the flexible display device.

Further, the present disclosure is to provide a flexible display device, the bending of which may be changed and fixed according to the surrounding structure on which the flexible display device is to be disposed, thereby improving the space utilization of the flexible display device.

In an aspect of the present disclosure, a flexible display device includes a display panel including at least one bending area bending about a bending axis; a frame supporting a rear surface of the display panel; a plurality of guide parts fixed to a rear surface of the frame; a plurality of fixing parts movably provided on the rear surface of the frame and selectively coupled to the plurality of guide parts; and a controller, the length of which is variable depending on the state of bending of the display panel, the controller being connected to the fixing parts to control movements of the fixing parts. When the fixing parts are coupled to the guide parts, the bent display panel may be prevented from being unbent.

According to various aspects, the flexible display device may be freely bent and arched as intended by the user and may be selectively unbent to return to a flat state as required. Thus, the practicability and satisfaction of the flexible display device may be improved.

The bending of the flexible display device may be changed and fixed according to the surrounding structure on which the flexible display device is to be disposed. Thus, the space utilization of the flexible display device may be improved.

The flexible display device may be configured to be integrally coupled to the rear surface of the frame and thus may be provided as a product in which the components are simplified and unified.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the present disclosure will be more clearly understood from the following detailed description, taken in conjunction with the accompanying drawings, in which.

DETAILED DESCRIPTION

Figure 1:
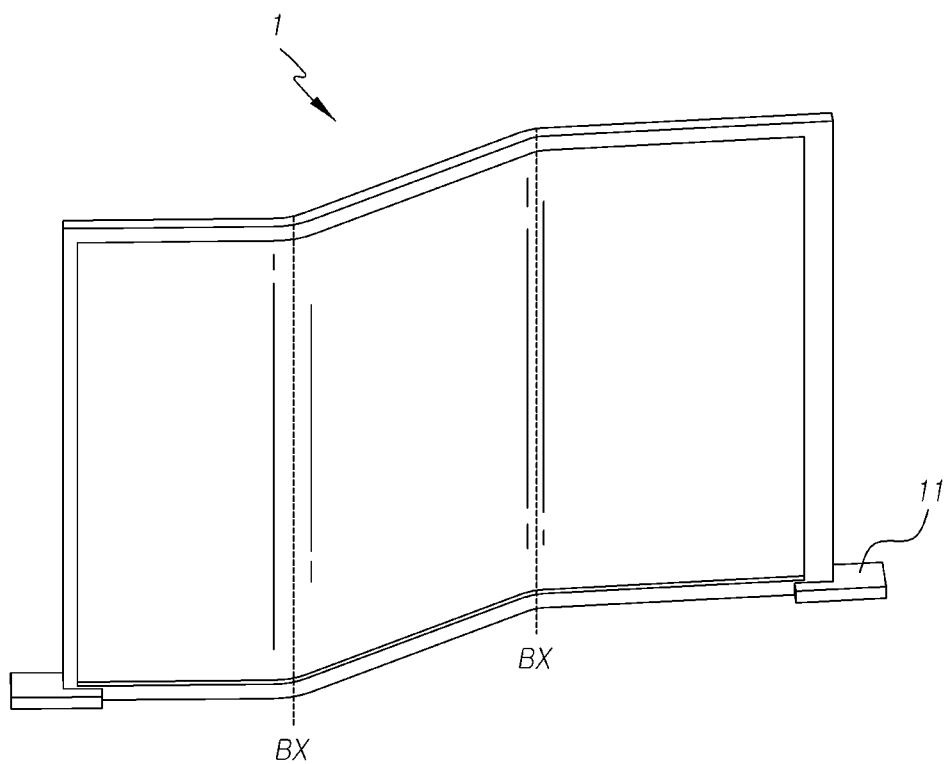
FIG. 1 is a perspective diagram illustrating a typical flexible display device.

In the following description of examples or aspects of the present disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting", "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps", etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e. g., level, range, etc.) include a tolerance or error range that may be caused by various factors (e. g., process factors, internal or external impact, noise, etc.) even when a relevant description is not specified. Further, the term "may" fully encompasses all the meanings of the term "may".

Hereinafter, a variety of aspects of the present disclosure will be described in detail with reference to the accompanying drawings.

Figure 2:
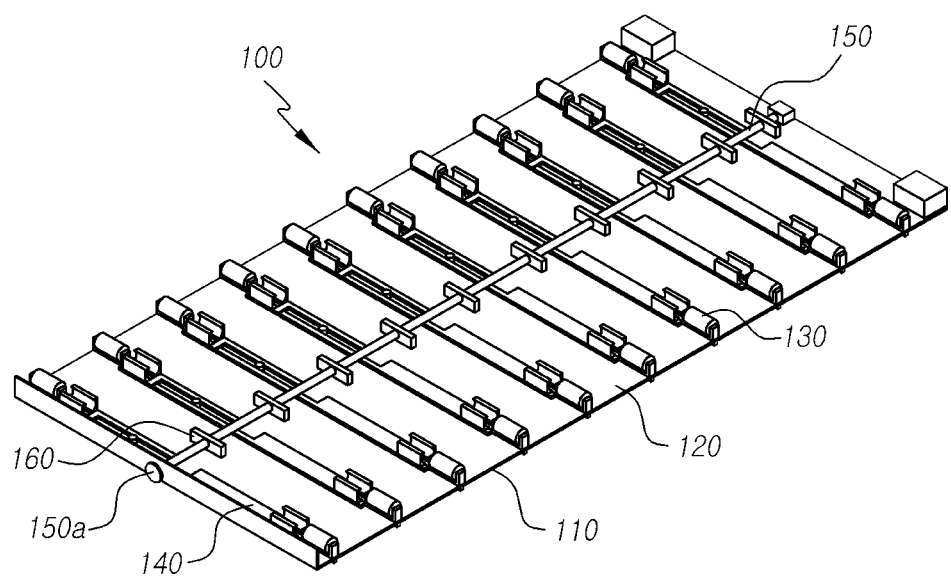
FIG. 2 is a perspective diagram illustrating a flexible display device according to an aspect of the present disclosure.
Figure 3:
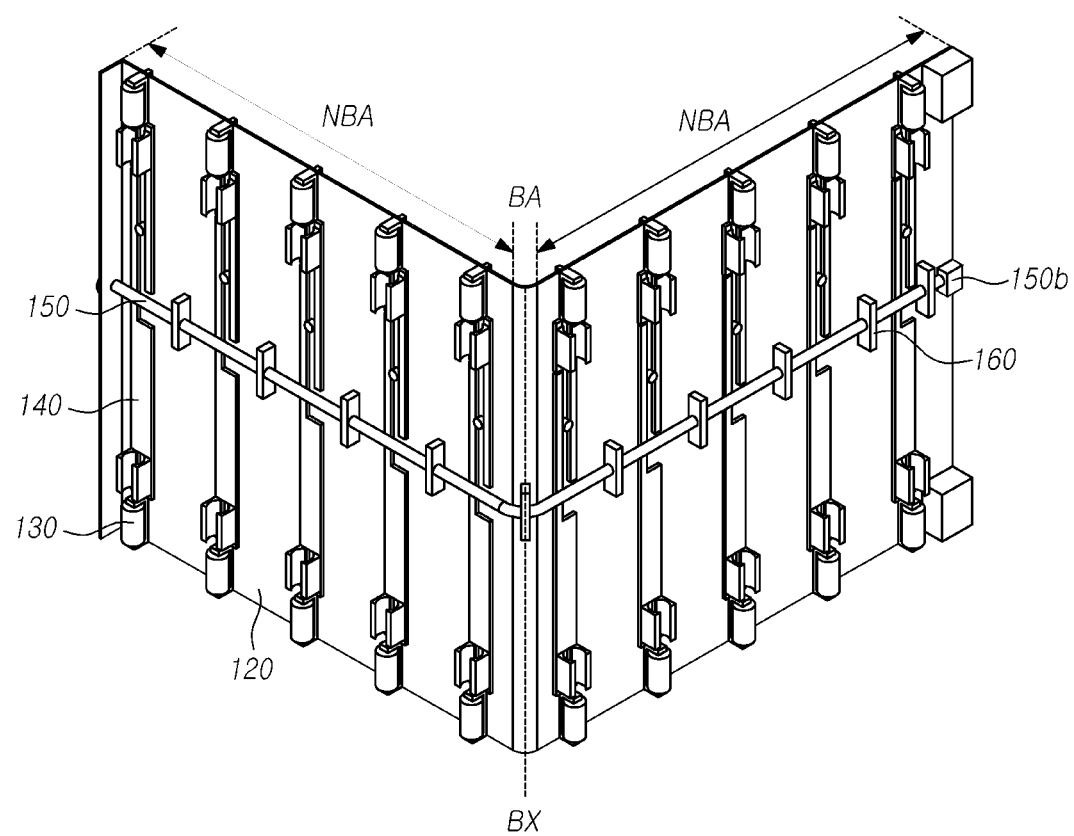
FIG. 3 is a perspective diagram illustrating a state in which the flexible display device illustrated in FIG. 2 is bent.

FIG. 2 is a perspective diagram illustrating a flexible display device 100 according to an aspect, and FIG. 3 is a perspective diagram illustrating a state in which the flexible display device 100 illustrated in FIG. 2 is bent.

Referring to FIGS. 2 and 3, the flexible display device 100 may include a display panel 110, a frame 120, guide parts 130, fixing parts 140, and a controller 150.

Hereinafter, in the present aspect, for convenience of description, the frame 120, the guide parts 130, the fixing parts 140, and the controller 150 will be described as being located on the rear surface of the display panel 110 on the assumption that a display surface of the display panel 110 on which images are displayed faces forward.

The display panel 110 is a panel on which images are displayed. In the display panel 110, light-emitting elements for realizing images and circuits, conductive lines, components, and the like for driving the light-emitting elements may be disposed. For example, the display panel 110 may be implemented, as light-emitting elements, using organic light-emitting diodes (OLEDs) able to maintain display performance even when bent like paper.

OLEDs are self-illuminating elements serving as representative elements of flexible display devices. OLED display devices using such OLEDs may be lightweight and have a thin profile, since a backlight used in a liquid crystal display (LCD) device, i.e., a display device that does not emit light by itself, may not be necessary. OLED display devices have a variety of merits such as wider viewing angles, lower power consumption, operability at a DC low voltage, higher response rates, robustness against external shocks due to solid internal components thereof, and a wider operating temperature range, compared to LCD devices. In particular, since OLED display devices have a simpler manufacturing process, manufacturing costs of OLED display devices may be reduced more than those of LCD devices.

The display panel 110 may include at least one bending area BA configured to bend about a bending axis BX. For example, the display panel 110 may include the bending area BA and non-bending areas NBA located on both sides of the bending area BA.

The bending area BA is a bendable area, i.e., an area in which the flexible display device 100 may be bent (or folded). The bending area BA may be bent about the bending axis BX at a specific radius of curvature. In contrast, in a state in which the flexible display device 100 is unbent, the bending area BA and the non-bending areas NBA may form a single plane.

Although the bending axis BX is illustrated as being disposed at the center of the display panel 110 in FIG. 3, the position and the number of the bending axes BX may be variously modified. In addition, the folding area FA may be variously modified depending on the position and number of the folding axes FX but is not limited thereto.

The frame 120 is configured to support the rear surface of the display panel 110. The frame 120 may be coupled to the rear surface of the display panel 110 to support the display panel 110. For example, the frame 120 may include a hinge part (not shown) to guide the bending of the bending area BA. The bending area BA of the display panel 110 may be bent at a predetermined curvature by means of the hinge part.

The guide parts 130 may be fixed to the rear surface of the frame 120. For example, a plurality of guide parts 130 may be disposed on the rear surface of the frame 120 to be spaced apart from each other in the direction of the bending axis BX and in a direction perpendicular to the bending axis BX. Here, a pair of guide parts 130 spaced apart from each other in the direction of the bending axis BX may be disposed on one and the other sides of the frame 120 to be spaced apart from each other, with the controller 150 being disposed between the pair of guide parts 130. The number and distance of the guide parts 130 are not limited and may properly vary depending on the size of the display panel 110.

The fixing parts 140 are movably disposed on the rear surface of the frame 120, and may be selectively coupled to the guide parts 130. For example, a plurality of fixing parts 140 may be disposed on the rear surface of the frame 120 to be spaced apart from each other in the direction perpendicular to the bending axis BX. The plurality of fixing parts 140 are configured to be linearly movable in the direction of the bending axis BX to move toward and be coupled to the guide parts 130.

Specifically, each of the fixing parts 140 and the guide parts 130 may have meshing teeth, such that each of the fixing parts 140 may be coupled to the corresponding guide 130 by engagement of the meshing teeth thereof. When the meshing teeth of the fixing parts 140 are engaged with the meshing teeth of the guide parts 130, movement between the guide parts 130 and the fixing parts 140 may be suppressed. The structure and coupling relationship of the guide parts 130 and the fixing parts 140 as described above will be described in detail below.

The length of the controller 150 is variable depending on the state of bending of the display panel 110, and the controller 150 may be connected to the fixing parts 140 to control the movement of the fixing parts 140. For example, the controller 150 may be disposed on the central portion of the rear surface of the frame 120 to be elongated in the longitudinal direction. The controller 150 may be connected to the fixing parts 140 by means of the meshing teeth to move the fixing parts 140 toward the guide parts 130 in response to rotation. That is, in response to rotational driving of the controller 150, the fixing parts 140 may linearly move toward the guide parts 130 to be coupled to the guide parts 130. The coupling structure and detailed driving method of the controller 150 and the fixing parts 140 as described above will be described below.

One side of the controller 150 may extend through a side portion of the frame 120 such that a portion thereof may be observed from the outside. The other side of the controller 150 may be connected to an elastic member 150b such as a spring such that the length of the controller 150 may be increased or reduced due to the bent state. Here, the controller 150 may be provided with a knob 150a on one end thereof exposed to the outside to facilitate gripping. Thus, the fixing parts 140 may be moved toward the guide parts 130 by gripping and turning the knob 150a.

The controller 150 may be aligned on the rear surface of the frame 120 in one direction by means of guide members 160.

Each of the guide members 160 has a hole extending through side surfaces thereof to allow the controller 150 to pass through the hole. The guide members 160 may be disposed on the rear surface of the frame 120 to be spaced apart from the fixing parts 140 so as not to interfere with the fixing parts 140. Due to this configuration of the guide members 160, the controller 150 elongated in one direction may be prevented from being released from the frame 120 and, at the same time, the state of coupling of the controller 150 to the fixing parts 140 may be more firmly maintained.

Figure 4:
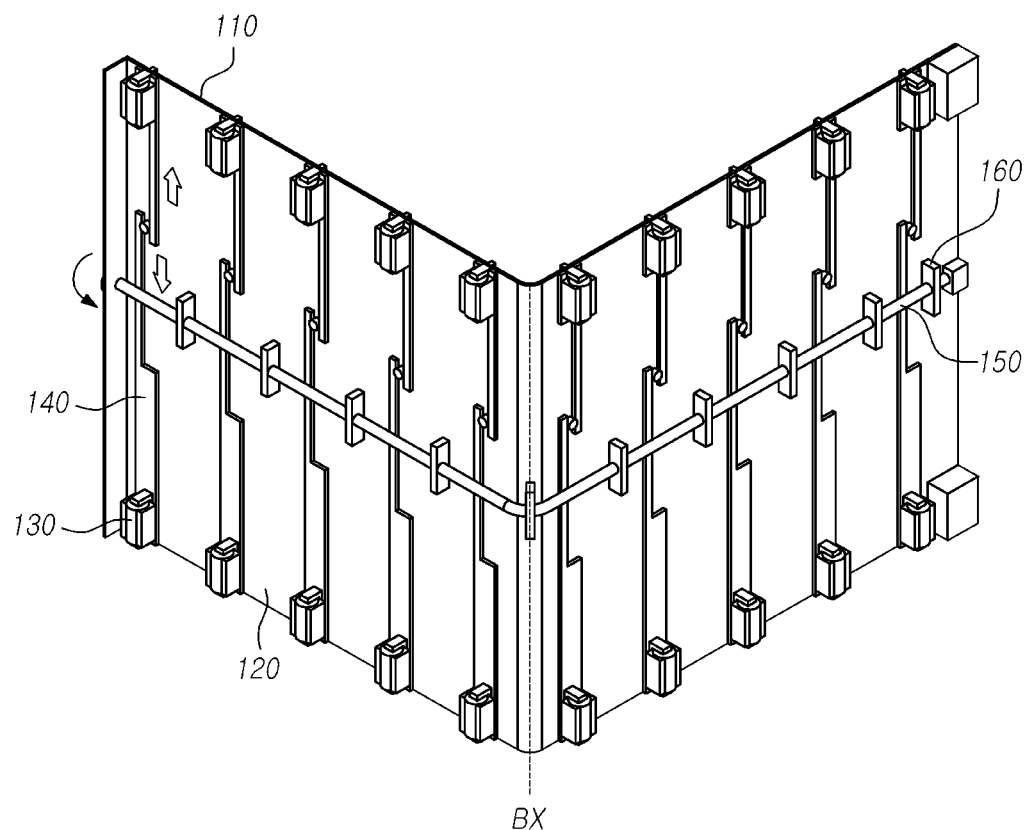
FIG. 4 is a perspective diagram illustrating a state in which the bent state of the flexible display device illustrated in FIG. 3 is fixed.

FIG. 4 is a perspective diagram illustrating a state in which the bent state of the flexible display device illustrated in FIG. 3 is fixed.

As illustrated in FIG. 4, the fixing parts 140 may be moved toward the guide parts 130 by the controller 150, and portions of the fixing parts 140 may be coupled to the guide parts 130. When the fixing parts 140 are coupled to the guide parts 130 in this manner, the display panel 110 may be prevented from being unbent.

That is, when the fixing parts 140 are not coupled to the guide parts 130, the display panel 110 may be bent but the bent state of the display panel 110 may not be maintained. However, as in the present aspect, when the fixing parts 140 are coupled to and restrained by the guide parts 130, the position of the controller 150 connected to the fixing parts 140 is also fixed and the length is prevented from being changed. Thus, the bent state intended by a user may be maintained without separate mounts 11.

Figure 5:
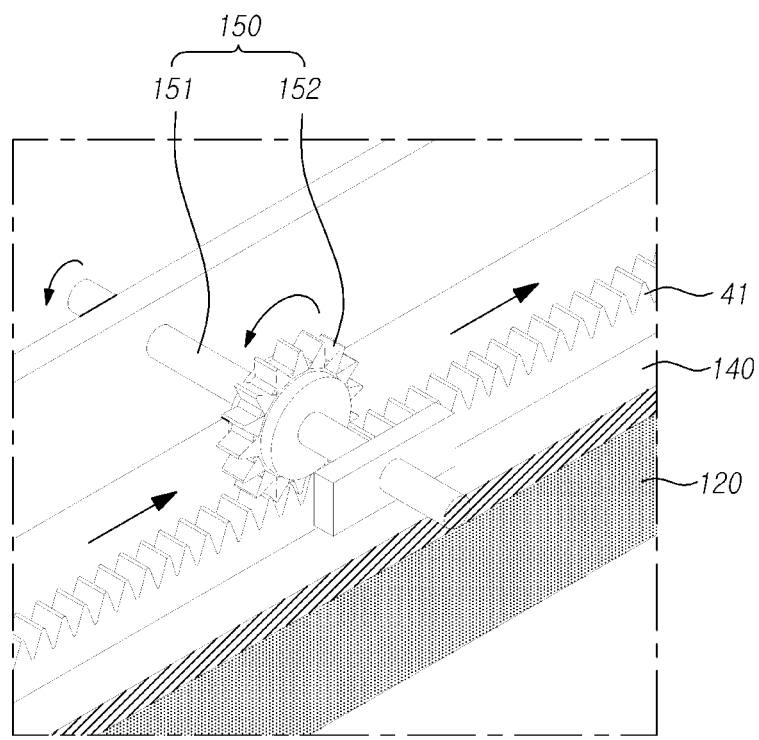
FIG. 5 is a perspective diagram schematically illustrating the state of coupling of the controller and the fixing part according to an aspect of the present disclosure.

FIG. 5 is a perspective diagram schematically illustrating the state of coupling of the controller and the fixing part according to an aspect.

Referring to FIG. 5, the fixing part 140 may include a rack gear 41 having meshing teeth on one surface, and the controller 150 may include a pinion gear 152 having meshing teeth on the outer circumference to engage with the meshing teeth of the rack gear 41 of the fixing part 140.

For example, the controller 150 may be configured such that the pinion gear 152 including a plurality of meshing teeth is coupled to a wire 151 composed of a flexible material, and the fixing part 140 may be implemented as the rack gear 41 including the meshing teeth provided on a portion of the rear surface. Due to the rack gear 41, when the controller 150 is rotated, the fixing part 140 may move linearly. The meshing teeth provided on the rack gear 41 of the fixing part 140 are engaged with the meshing teeth provided on the pinion gear 152 of the controller 150. When the controller 150 is rotated, the fixing part 140 may move in one direction.

Thus, when the controller 150 is rotated clockwise, the fixing part 140 may be coupled to the corresponding guide part 130 by linearly moving in one direction. In contrast, when the controller 150 is rotated counterclockwise, the fixing part 140 may be decoupled from the guide part 130 by linearly moving in the opposite direction.

Although the controller 150 and the fixing part 140 have been described and illustrated as being connected by means of the meshing teeth so that the fixing part 140 linearly moves in aspects, the present disclosure is not limited thereto. For example, the fixing part 140 may be moved using a driving motor, an LM guide, and the like, and automatic control may be enabled by coupling a rotating actuator (not shown) to the controller 150.

Figure 6:
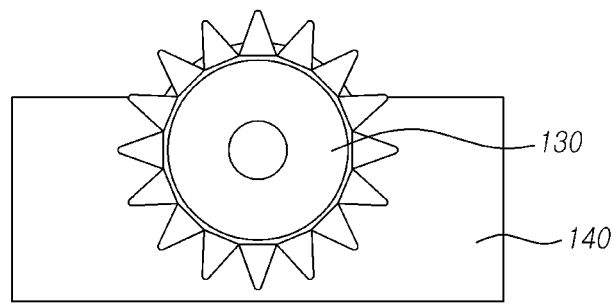
FIG. 6 is a diagram schematically illustrating the state of coupling of the fixing part and the guide part according to an aspect of the present disclosure.

FIG. 6 is a diagram schematically illustrating the state of coupling of the fixing part and the guide part according to an aspect.

Referring to FIG. 6, the meshing teeth may be provided on an outer portion of the guide part 130 and the meshing teeth may be provided on an inner portion of the fixing part 140 to engage with the meshing teeth of the guide part 130. Due to the coupling structure of the guide part 130 and the fixing part 140, variations in the length of the controller 150 may be suppressed.

That is, as illustrated in FIG. 3, when the display panel 110 is bent by external force in a state in which the guide part 130 and the fixing part 140 are decoupled from each other, the elastic member 150b connected to one portion of the controller 150 is tensioned. When external force is released, the elastic member 150b is contracted by restorative force of the display panel 110 and the bent state is partially released.

However, as illustrated in FIG. 4, during bending, when the meshing teeth of the guide part 130 are engaged with the meshing teeth of the fixing part 140 in a state in which the elastic member 150b is tensioned, the position of the controller 150 connected to the fixing part 140 is fixed, and thus the display panel 110 may maintain the bent state instead of returning to the original state.

Figure 7:
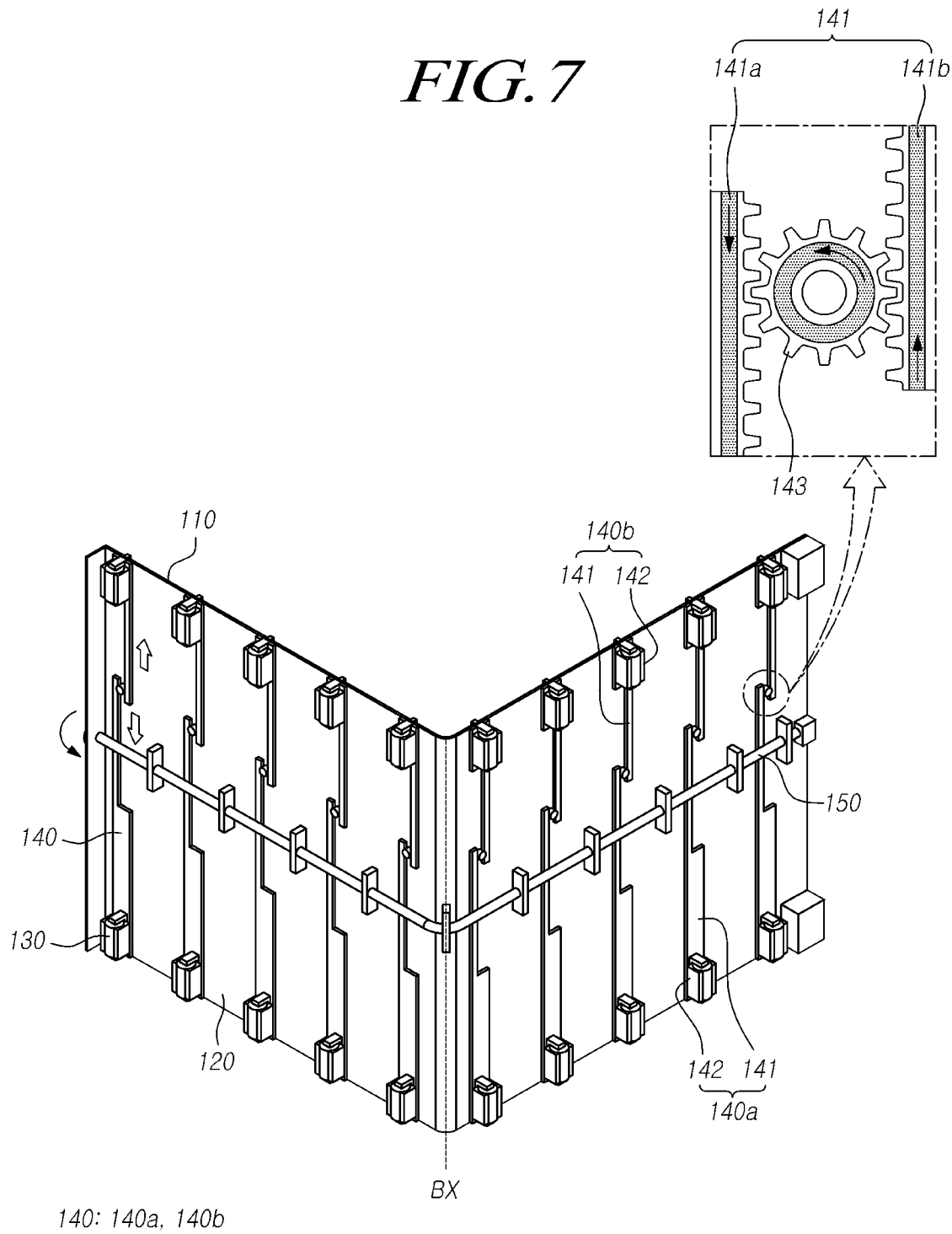
FIG. 7 is a diagram schematically illustrating the fixing parts according to an aspect.

FIG. 7 is a diagram schematically illustrating the fixing parts according to an aspect.

Referring to FIG. 7, each of the fixing parts 140 may be comprised of a pair of fixing parts 140a and 140b configured to be moved in opposite directions by the controller 150. The fixing parts 140a and 140b may be coupled to the guide parts 130 disposed on both sides of the frame 120, respectively. For example, the fixing part 140 may include the first fixing part 140a and the second fixing part 140b disposed on one and the other sides of the fixing part 140, respectively, to be spaced apart from each other, with the controller 150 being disposed between the first and second fixing parts 140a and 140b.

Specifically, each of the first fixing part 140a and the second fixing part 140b may include a movable member 141 provided on the rear surface of the frame 120 to be movable in the direction of the bending axis BX and a coupling member 142 provided on one surface of the movable member 141 to be selectively coupled to the corresponding guide part 130. For example, the coupling member 142 has an inner hole allowing the guide part 130 to be inserted thereinto and meshing teeth provided on the inner circumference of the inner hole to engage with the meshing teeth provided on the outer circumference of the guide part 130.

Each of the first fixing part 140a and the second fixing part 140b has meshing teeth to be movably connected to the controller 150. For example, the controller 150 may include the flexible wire 151 elongated in the direction perpendicular to the bending axis BX and the pinion gear 152 coupled to the wire 151 (see FIG. 5). In addition, each of the first fixing part 140a and the second fixing part 140b may include a first rack gear 141a and a second rack gear 141b elongated in the direction of the bending axis BX to engage with the pinion gear 152 of the controller 150.

The first rack gear 141a of the first fixing part 140a may be connected to the controller 150. When the controller 150 is rotated, the first rack gear 141a may move toward the guide part 130 provided on one side of the frame 120. Here, the first rack gear 141a may be movably connected to the controller 150 and the second rack gear 141b. In this regard, the first rack gear 141a may have meshing teeth on a surface facing the controller 150 and meshing teeth on a surface facing the second rack gear 141b.

The second rack gear 141b of the second fixing part 140b may be disposed such that the second rack gear 141b and the first rack gear 141a face other while being disposed on both sides of the controller 150. The second rack gear 141b may be connected to the first rack gear 141a by means of a spur gear 143 to move toward the guide part 130 provided on the other side of the frame 120 when the controller 150 is rotated.

That is, when the controller 150 is rotated, the first fixing part 140a and the second fixing part 140b may be moved in opposite directions by means of the first rack gear 141a and the second rack gear 141b to be coupled to or decoupled from respective guide parts 130 disposed on both sides of the frame 120. For example, when the controller 150 is rotated clockwise, the first fixing part 140a and the second fixing part 140b may move to the outside of the frame 120 to be coupled to the guide parts 130. When the controller 150 is rotated counterclockwise, the first fixing part 140a and the second fixing part 140b may move into the frame 120 to be decoupled from the guide parts 130.

Figure 8:
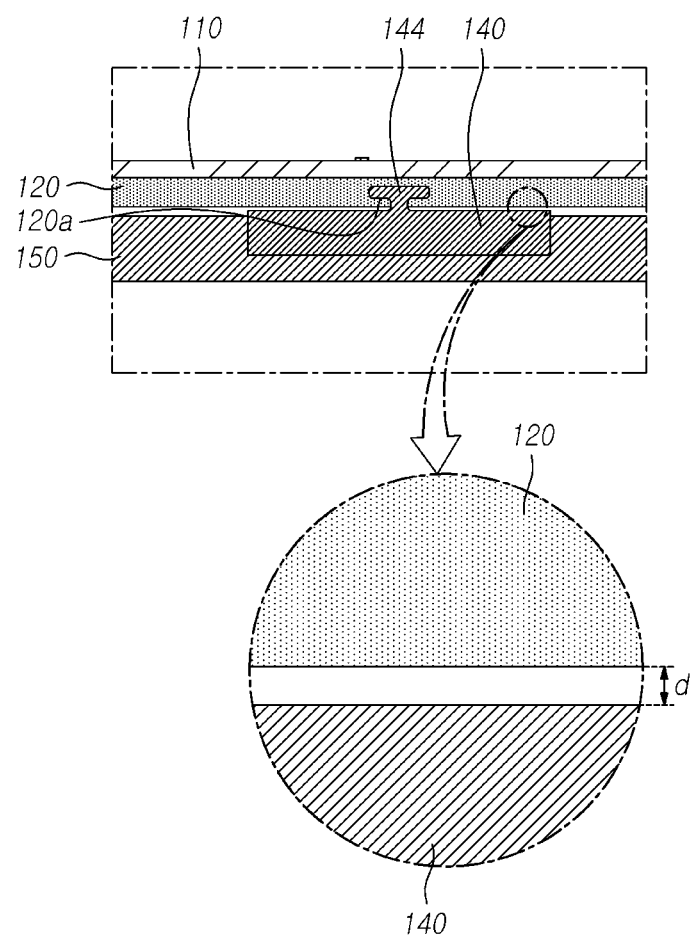
FIG. 8 is a cross-sectional diagram schematically illustrating the state of coupling of the frame and the fixing part according to an aspect of the present disclosure.

FIG. 8 is a cross-sectional diagram schematically illustrating the state of coupling of the frame and the fixing part according to an aspect.

Referring to FIG. 8, a rail groove 120a elongated in the direction of the bending axis BX may be formed in the rear surface of the frame 120, and a rail member 144 configured to be inserted into the rail groove 120a may protrude from one surface of the fixing part 140. Thus, when the controller 150 is rotated, the fixing part 140 may linearly move along the rail groove 120a without being released from the frame 120.

The protruding length of the rail member 144 formed on the fixing part 140 may be longer than the depth of the rail groove 120a to define a distance d between the fixing part 140 and the frame 120. Due to this distance d, when the display panel 110 is bent inwards or outwards, interference between the fixing part 140 and the frame 120 may be prevented. In this case, when the distance d is excessively large, the volume of the flexible display device 100 may be increased. Thus, the distance d may be provided in a size range of micrometers (μm) to millimeters (mm).

Figure 9:
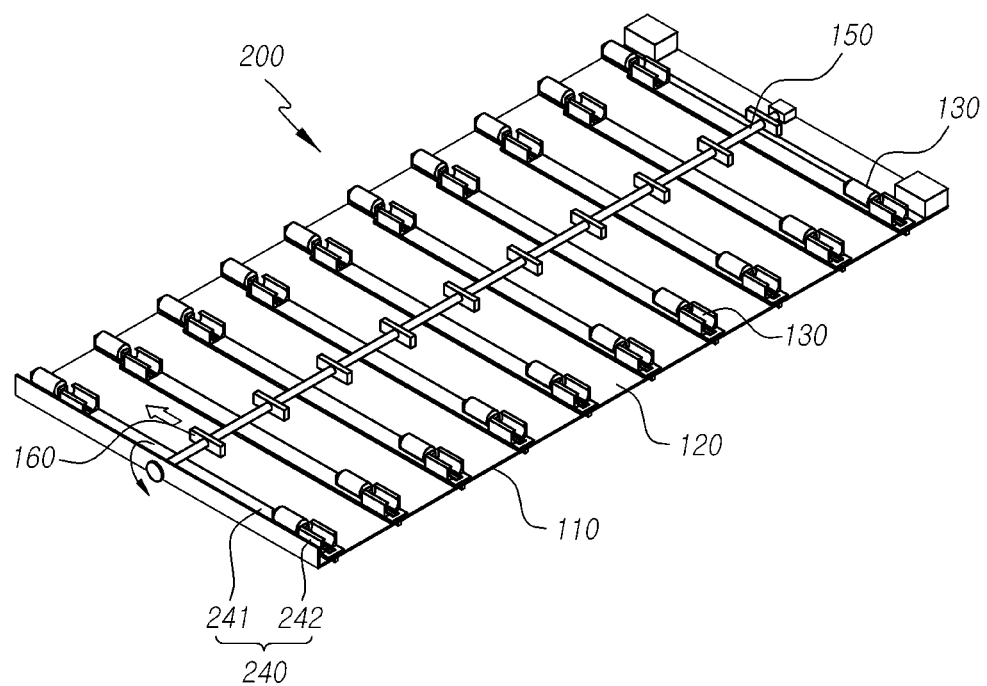
FIG. 9 is a perspective diagram schematically illustrating a flexible display device including fixing parts according to another aspect of the present disclosure.

FIG. 9 is a perspective diagram schematically illustrating a flexible display device 200 including fixing parts according to another aspect. In description of the present aspect, features of the present aspect different from those of the foregoing aspect will be mainly described.

Referring to FIG. 9, the flexible display device 200 may include fixing parts 240 configured to be moved in one direction by the controller 150 such that coupling members 242 are coupled to the guide parts 130, respectively. For example, each of the fixing parts 240 may include a movable member 241 movably connected to the controller 150 and the coupling members 242 provided on both ends of the movable member 241 to be selectively restrained by the guide parts 130.

That is, in the aspect described above with reference to FIG. 7, each of the fixing parts 140 includes the first fixing part 140a and the second fixing part 140b configured to move in opposite directions when the controller 150 is rotated and driven to couple the coupling members 142 to the guide parts 130. In contrast, in the present aspect, each of the fixing parts 240 is configured to move in one direction when the controller 150 is rotated and driven to couple the coupling members 242 to the guide parts 130.

For example, the coupling members 242 may be provided on both ends of the movable member 241. A pair of guide parts 130 may be disposed on one side and the other side of the frame 120 and spaced apart from each other, with the controller 150 being disposed between the pair of guide parts 130, so as not to interfere with the movable member 241. In addition, the controller 150 and the movable member 241 are connected such that the meshing teeth of the controller 150 are engaged with the meshing teeth of the movable member 241. When the controller 150 is rotated, the movable member 241 may move in one direction to be coupled to the guide parts 130.

In the present aspect, the coupling structure of the controller 150 and the movable member 241 is the same as that described above, and thus a detailed description and an illustration thereof will be omitted.

Figure 10:
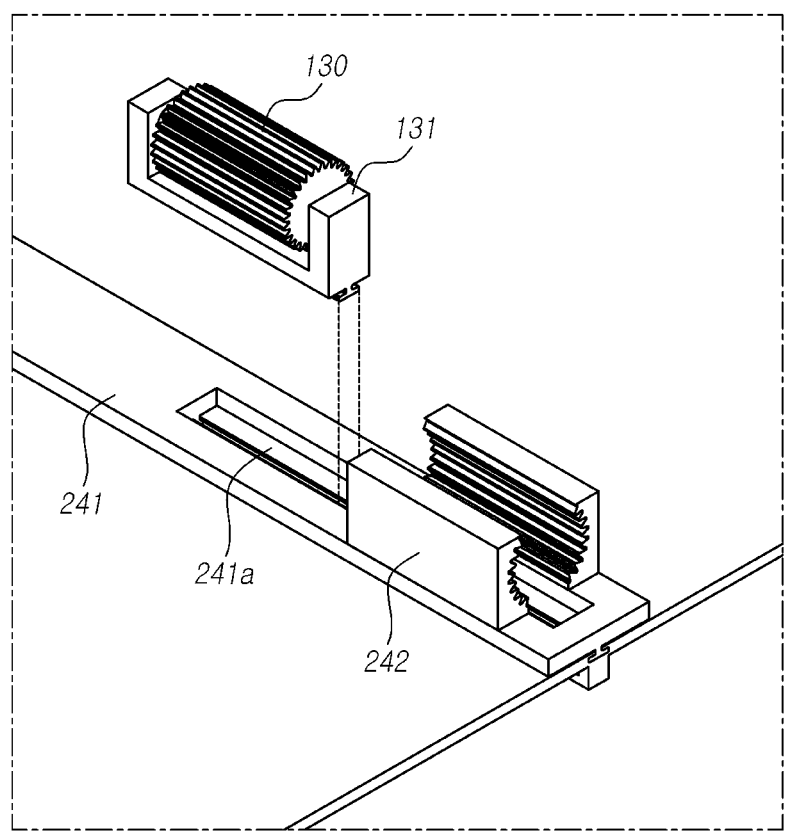
FIG. 10 is a diagram illustrating a part of FIG. 9 in which the guide part is decoupled from the fixing part.

FIG. 10 is a diagram illustrating a part of FIG. 9 in which the guide part is decoupled from the fixing part.

Referring to FIGS. 9 and 10, guide holes 214a into which portions of the guide parts 130 are inserted may be formed in both ends of the movable member 241. For example, each of the guide parts 130 may be fixedly disposed on a support member 131 and may be located within the guide hole 241a by means of the support member 131.

As a portion of the support member 131 is located within the guide hole 241a as described above, the movable member 241 may move without being interfered with the guide part 130. The length of the guide hole 241a may determine a distance that the movable member 241 moves.

Figure 11:
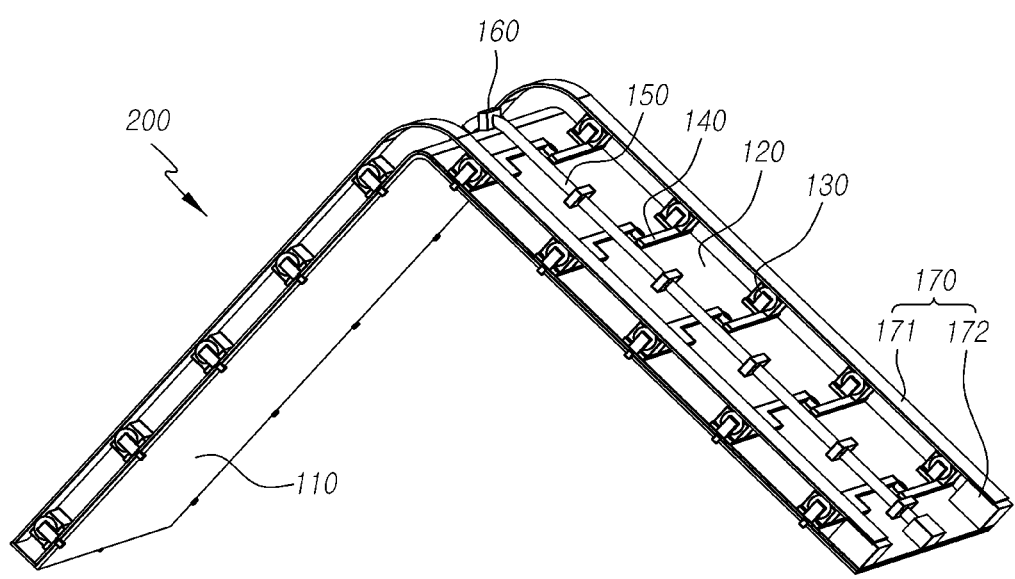
FIG. 11 is a perspective diagram illustrating a flexible display device according to another aspect of the present disclosure.

FIG. 11 is a perspective diagram illustrating a flexible display device 200 according to another aspect. In description of the present aspect, features of the present aspect different from those of the foregoing aspects will be mainly described.

Referring to FIG. 11, the flexible display device 200 may further include restoration assemblies 170 each configured to restore the bent state of the display panel 110 to the flat state when the fixing parts 140 are decoupled from the guide parts 130.

Each of the restoration assemblies 170 may be elongated in the direction perpendicular to the bending axis BX, and may be elastically deformed depending on the coupling state of the fixing parts 140 and the guide parts 130. Here, the term "elastic deformation" refers to a state in which a stretchable and contractible member, for example, a spring member, is provided in the restoration assembly 170 to allow the length of the restoration assembly 170 to be changed.

For example, the restoration assembly 170 may include a keeper 171 having meshing teeth formed on one surface thereof to engage with the meshing teeth formed on the outer circumference of the guide parts 130 and a winder 172 configured to wind the keeper 171 in response to external force applied to the keeper 171. Thus, when the fixing parts 140 are decoupled from the guide parts 130, the restoration assembly 170 may be contracted to restore the display panel 110 from the bent state.

Figure 12:
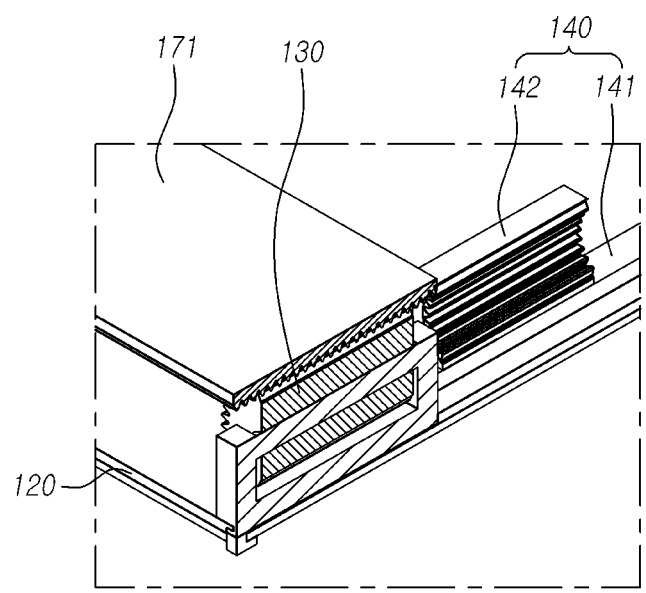
FIG. 12 is a perspective diagram schematically illustrating the state of coupling of the restoration assembly and the guide part illustrated in FIG. 11.

FIG. 12 is a perspective diagram schematically illustrating the state of coupling of the restoration assembly and the guide part illustrated in FIG. 11.

Referring to FIG. 12, the keeper 171 of the restoration assembly 170 may be configured such that the meshing teeth thereof are engaged with the meshing teeth of the guide parts 130. The guide parts 130 may be rotatably fixed to the rear surface of the frame 120 such that the keeper 171 may move while being stretched when the display panel 110 is bent.

The keeper 171 of the restoration assembly 170 may be configured to not interfere with the fixing parts 140 when the fixing parts 140 are coupled to the guide parts 130. For example, the height of the fixing parts 140 may be set to be lower than the height of the guide parts 130 such that the fixing parts 140 do not interfere with the restoration assembly 170 when the fixing parts 140 move toward the guide parts 130.

Figure 13:
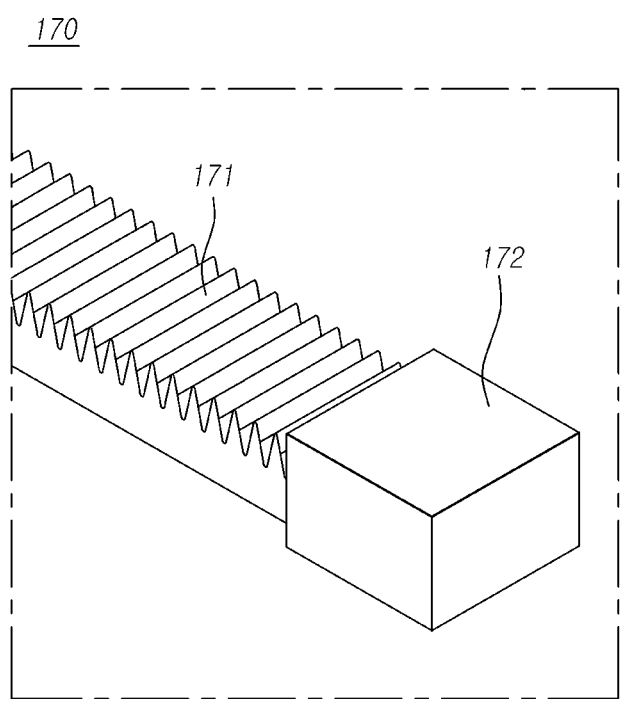
FIG. 13 is a perspective diagram schematically illustrating a portion of the restoration assembly according to an aspect of the present disclosure.

FIG. 13 is a perspective diagram schematically illustrating a portion of the restoration assembly according to an aspect. With reference to FIGS. 11 to 13, the structure of the keeper 171 and the winder 172 of the restoration assembly 170 will be described in detail as follows.

The keeper 171 may be composed of a flexible material to be bent and wound on the winder 172 when the display panel 110 is bent. For example, one end of the keeper 171 may be connected to the winder 172, and the other end of the keeper 171 may be connected to the frame 120.

The keeper 171 may be movably connected to the meshing teeth formed on the outer circumference of the guide parts 130. For example, the keeper 171 may be provided in the shape of a rack gear having meshing teeth on a surface facing the guide parts 130. Thus, the meshing teeth of the keeper 171 may be engaged with some of the meshing teeth of the guide parts 130. When the display panel 110 is bent, the keeper 171 may move in one direction while rotating the guide parts 130.

The winder 172 may be connected to one end of the keeper 171 to automatically withdraw or retract the keeper 171 in response to external force applied to the display panel 110. For example, the winder 172 may be implemented as a torsion spring connected to one end of the keeper 171.

The torsion spring is elastically deformable in response to torsion. The torsion spring may be stretched by external force, and when the external force is removed, may return to the original state due to energy accumulated therein. Here, a single torsion spring may be provided as a one-side torsion spring, or two torsion springs may be provided as double-side torsion springs connected to one side and the other side about the axis of rotation.

As the keeper 171 is connected to the winder 172 implemented as a torsion spring as described above, when the fixing parts 140 are decoupled from the guide parts 130, the keeper 171 may return to the original length by the restorative force of the winder 172. Due to the restorative force of the keeper 171, the bending area BA and the non-bending areas NBA of the display panel 110 achieve a flat state.

Figure 14:
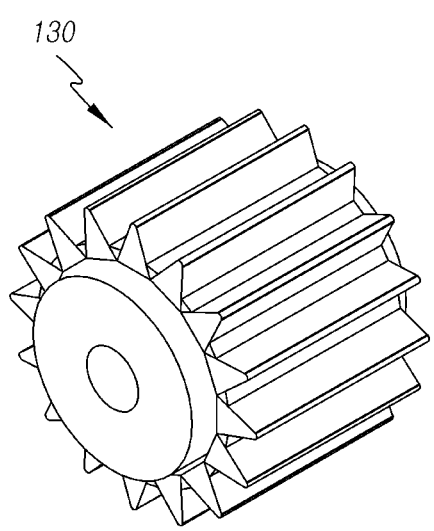
FIG. 14 is a perspective diagram schematically illustrating the guide part illustrated in FIG. 12.

FIG. 14 is a perspective diagram schematically illustrating the guide part illustrated in FIG. 12.

Referring to FIGS. 12 and 14, the guide part 130 may have the shape of a wheel with the meshing teeth formed on the outer circumference. The guide part 130 may be rotatably disposed on the rear surface of the frame 120. For example, the guide part 130 may be configured such that the meshing teeth formed on the outer circumference engage with the meshing teeth formed on one surface of the keeper 171. When the keeper 171 is restored, the guide part 130 may also rotate to guide the movement of the keeper 171.

The guide parts 130 and the keeper 171 may be configured such that distances between the teeth are the same. For example, when each of the guide parts 130 has 360 teeth, the guide part 130 may rotate by 1° to move the keeper 171.

Even in the case in which the distances between the teeth are the same, the teeth of the keeper 171 may interfere with the teeth of the guide part 130 depending on the position of the keeper 171, since the guide part 130 rotates while fixed to the frame 120. To overcome this problem, the meshing teeth of the guide part 130 or the meshing teeth of the keeper 171 may have a tapered shape. That is, the meshing teeth of the guide part 130 or the meshing teeth of the keeper 171 may be formed to be inclined in one direction to provide a play (i. e., a space for movement) having a predetermined size between the meshing teeth of the guide part 130 and the meshing teeth of the keeper 171. Due to the space for movement, the interference between the guide part 130 and the keeper 171 may be removed.

Figure 15:
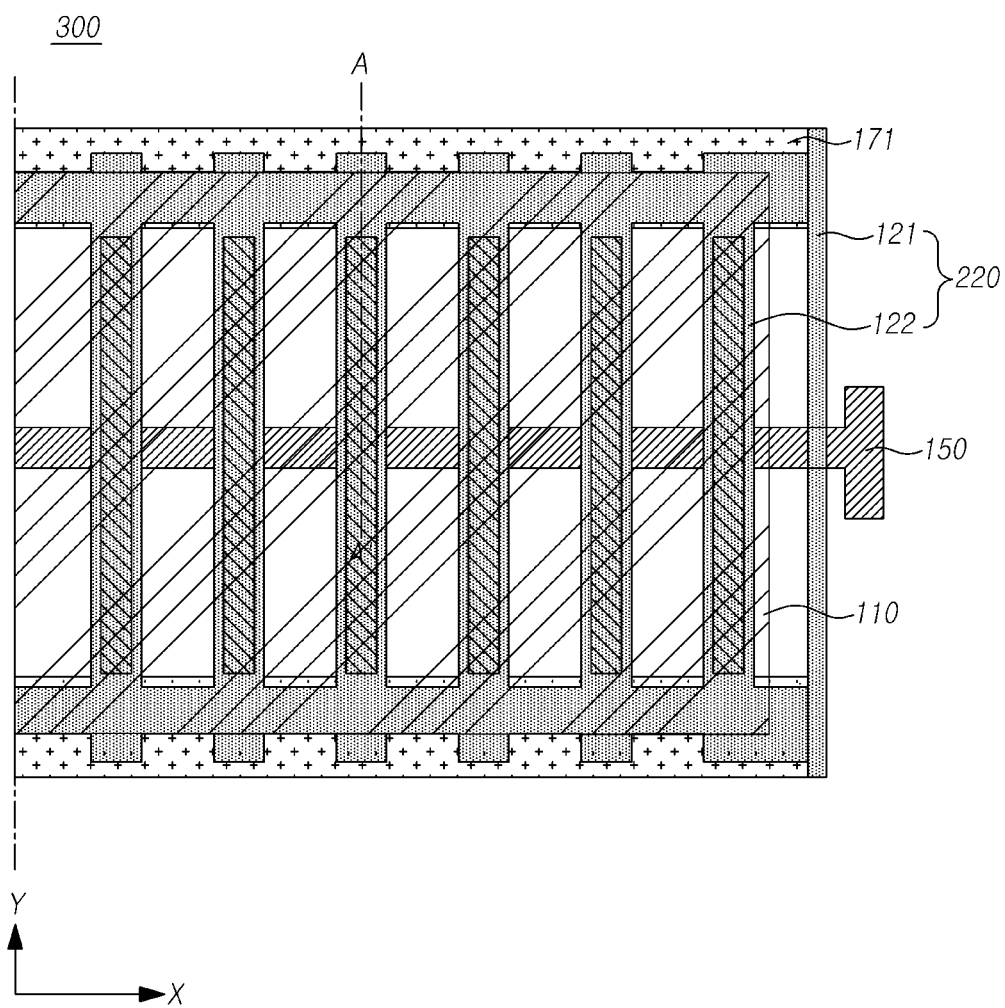
FIG. 15 is a diagram schematically illustrating some components of a flexible display device including a frame according to another aspect of the present disclosure.
Figure 16:
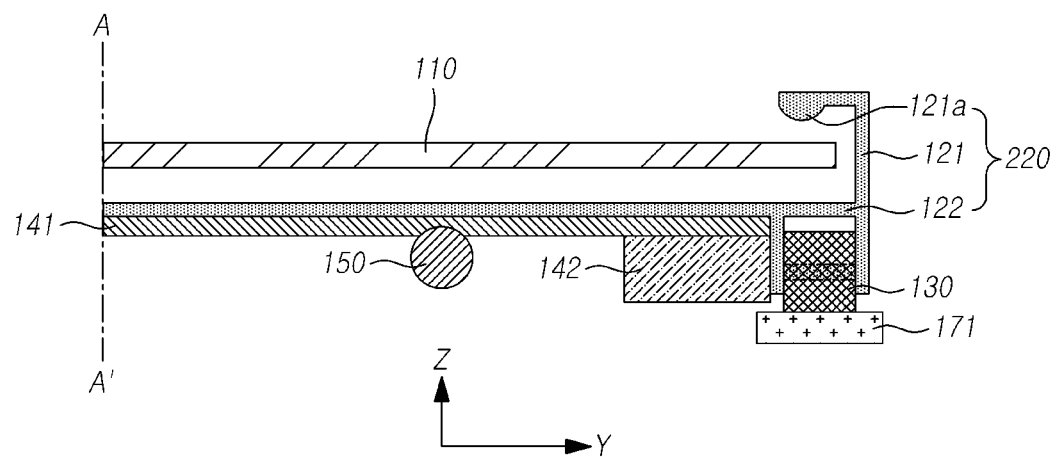
FIG. 16 is a cross-sectional diagram taken along line A-A' in FIG. 15.

FIG. 15 is a diagram schematically illustrating some components of a flexible display device 300 including a frame according to another aspect, and FIG. 16 is a cross-sectional diagram taken along line A-A' in FIG. 15. In description of the present aspect, features of the present aspect different from those of the foregoing aspects will be mainly described.

Referring to FIGS. 15 and 16, a frame 220 of the flexible display device 300 may include a side frame 121 and support frames 122.

The side frame 121 may be configured to surround a portion of the front surface and side portions of the display panel 110. For example, a through-hole allowing the controller 150 to pass through may be formed in a portion of the side frame 121. A hemispherical protrusion 121a may be formed on a peripheral portion of a surface facing the display panel 110.

As the hemispherical protrusion 121a is provided on a peripheral portion of the side frame 121 as described above, one end of the display panel 110 may be prevented from interfering with the side frame 121 when the display panel 110 is bent. That is, when the display panel 110 is bent, both ends are bent upwards, i.e., in the direction of the Z axis in the figure. Due to this phenomenon, interference may occur between the display panel 110 and the side frame 121, thereby damaging the display panel 110.

However, when the hemispherical protrusion 121a is provided on the peripheral portion of the side frame 121 as in the present aspect, no space for movement is formed between the side frame 121 and the end of the display panel 110. Thus, the interference between the side frame 121 and the display panel 110 may be prevented.

A plurality of support frames 122 may have the shape of a bar elongated in the direction of the bending axis BX of the display panel 110, i.e., the Y-axis direction in the figure, and may be disposed on the rear surface of the side frame 121 to be spaced apart from each other. As the plurality of support frames 122 are spaced apart from each other as described above, the bending of the display panel 110 may be more properly performed through the spaces, and interference between the frames 220 during the bending may be removed.

Figure 17:
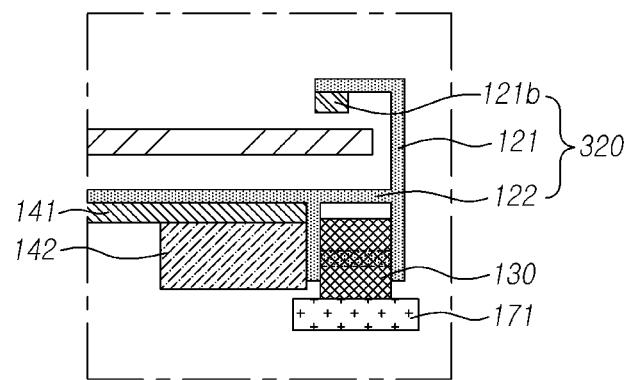
FIG. 17 is a cross-sectional diagram schematically illustrating a portion of a frame according to another aspect of the present disclosure.

FIG. 17 is a cross-sectional diagram schematically illustrating a portion of a frame according to another aspect. In description of the present aspect, features of the present aspect different from those of the foregoing aspects will be mainly described.

Referring to FIG. 17, a frame 320 may include a side frame 121 and a support frame 122. The side frame 121 may include a contact pad 121b on the periphery of a surface facing the display panel 110.

As the contact pad 121b is provided on the periphery of the side frame 121 as described above, one end of the display panel 110 may be prevented from interfering with the side frame 121 when the display panel 110 is bent. That is, the contact pad 121b is configured to realize the same effect as that of the protrusion 121a described above. Due to the configuration of the contact pad 121b, damage to the display panel 110 may be prevented.

Figure 18:
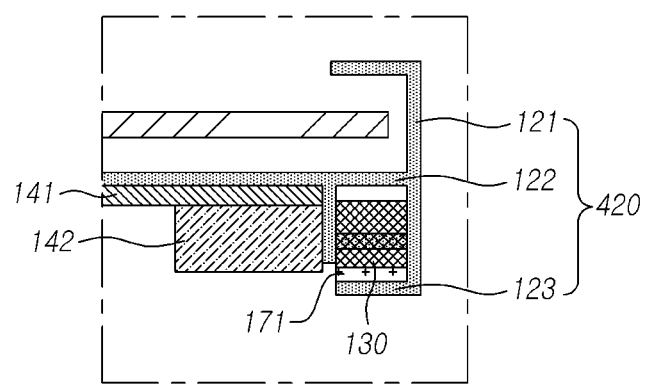
FIG. 18 is a cross-sectional diagram schematically illustrating a portion of a frame according to another aspect of the present disclosure.

FIG. 18 is a cross-sectional diagram schematically illustrating a portion of a frame according to another aspect. In description of the present aspect, features of the present aspect different from those of the foregoing aspects will be mainly described.

Referring to FIG. 18, a frame 420 may include a side frame 121, a support frames 122, and an anti-release frame 123.

The anti-release frame 123 is configured to support the bottom of the keeper 171 to prevent the keeper 171 from being released. The anti-release frame 123 may protrude from the rear surface of the support frame 122 in a shape corresponding to the side frame 121. Due to the configuration of the anti-release frame 123, the keeper 171 may be reliably wound between the guide part 130 and the anti-release frame 123.

Figure 19:
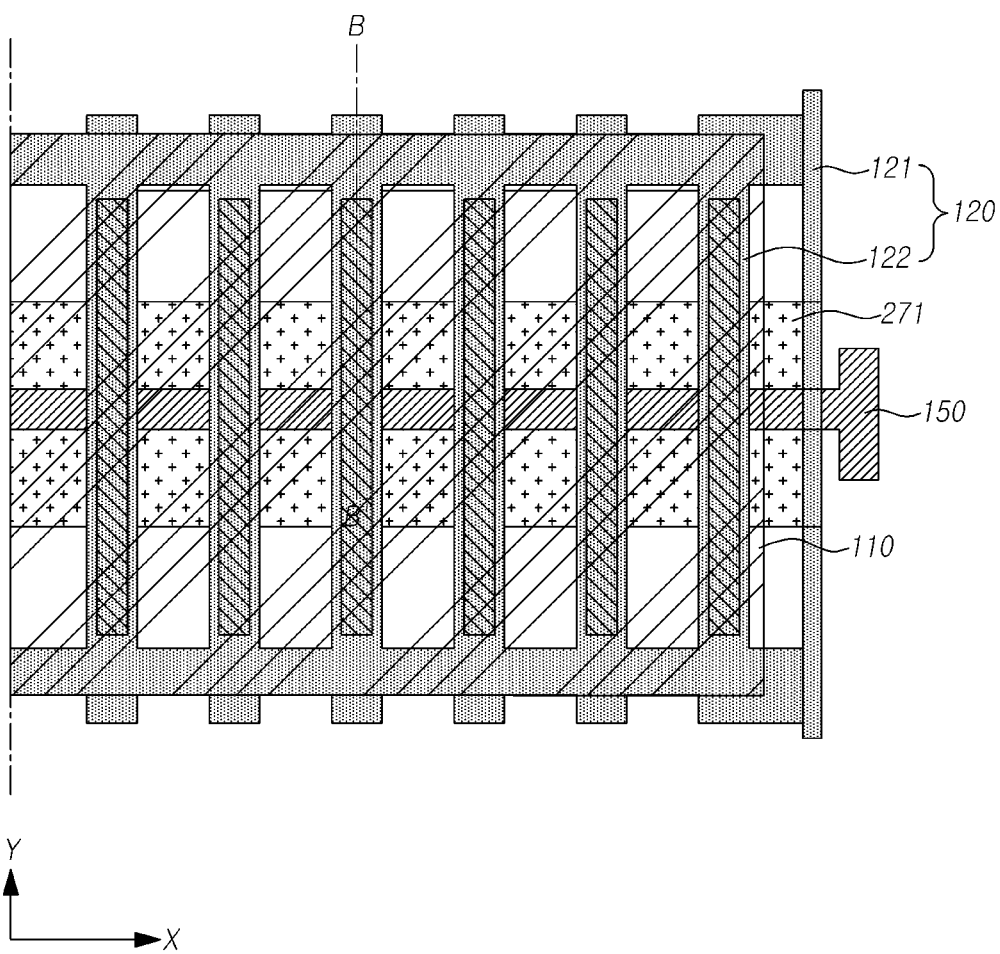
FIG. 19 is a diagram schematically illustrating a part of flexible display device including a keeper according to another aspect of the present disclosure.
Figure 20:
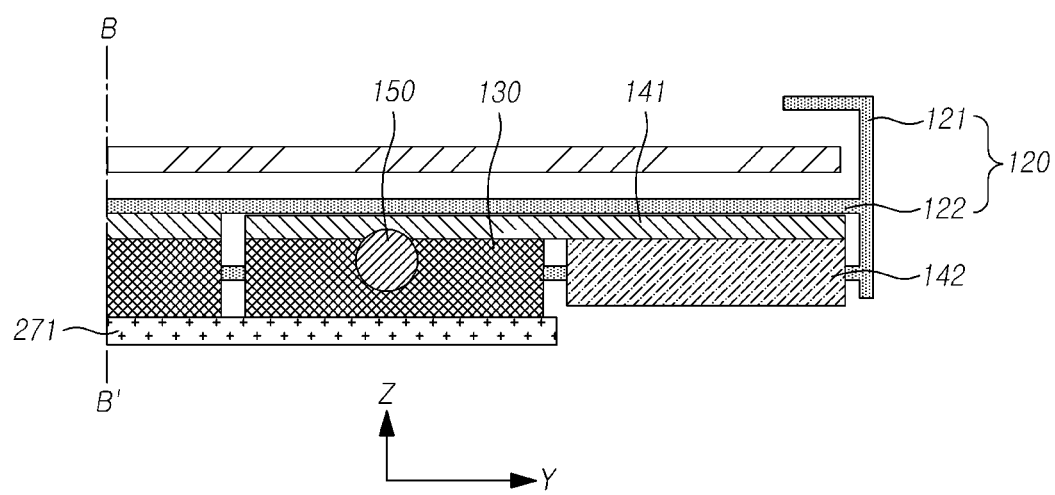
FIG. 20 is a cross-sectional diagram taken along line B-B' in FIG. 19.

FIG. 19 is a diagram schematically illustrating a part of flexible display device 400 including a keeper according to another aspect, and FIG. 20 is a cross-sectional diagram taken along line B-B' in FIG. 19. In description of the present aspect, features of the present aspect different from those of the foregoing aspects will be mainly described.

Referring to FIGS. 19 and 20, the flexible display device 400 may include a keeper 271 disposed at the center of the rear surface of the frame 120 and elongated in a direction perpendicular to the bending axis BX. For example, the keeper 271 may be elongated in the direction of the X axis in the figures, and may be movably connected to the guide parts 130. That is, although two keepers 171 are located on both sides of the rear surface of the frame 120 in the foregoing aspects, a single keeper 271 may be located at the center of the frame 120 in the present aspect.

When a single keeper 271 is provided at the center as described above, the coupling members 142 may be configured to move in the direction of the controller 150 from both sides of the frame 120. In addition, the width of the keeper 271 may be further increased such that the guide parts 130 may be reliably coupled to the keeper 171. For example, the width of the keeper 271 may be set to be two or more times the length of the guide parts 130.

Figure 21:
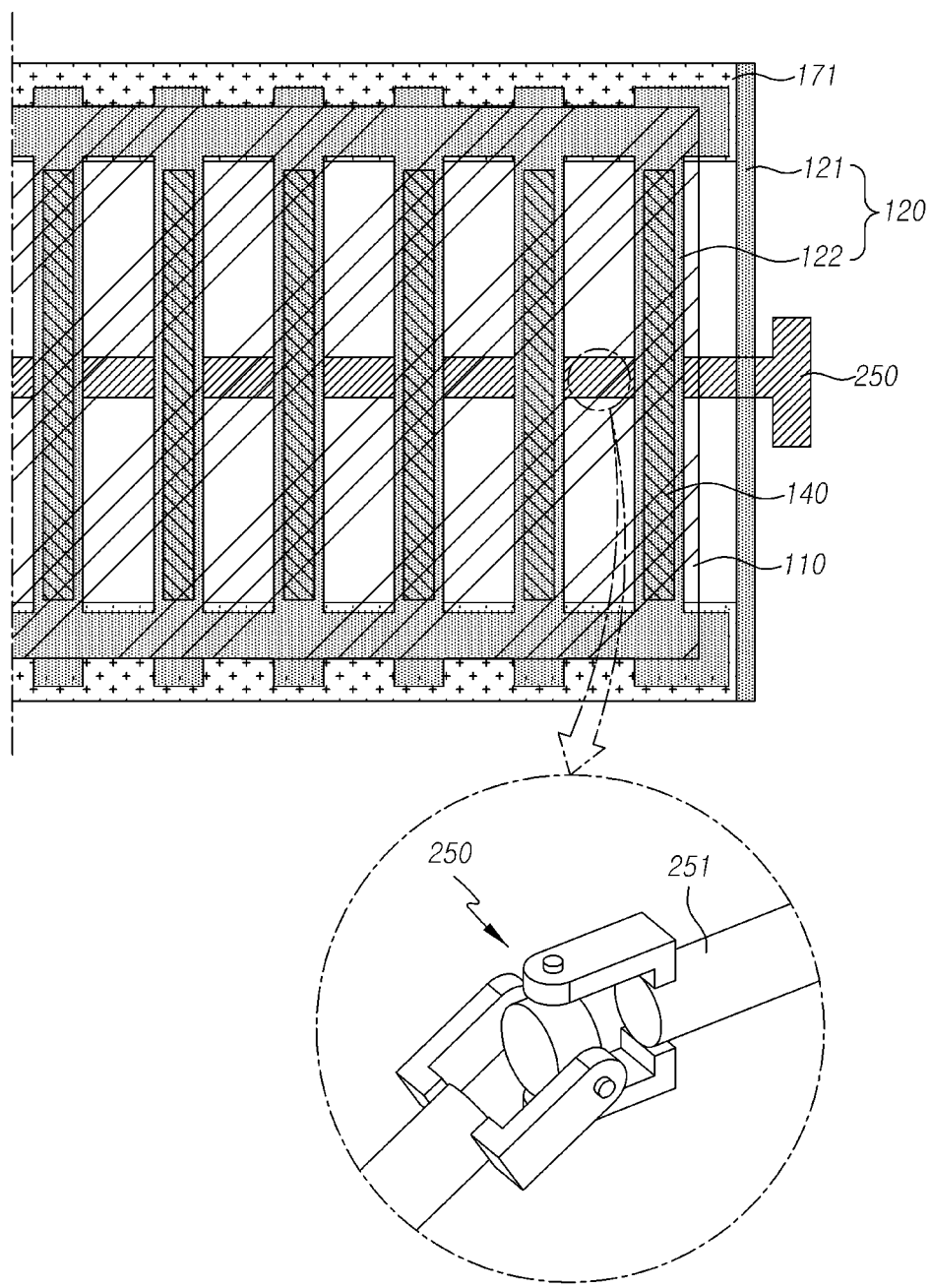
FIG. 21 is a diagram schematically illustrating a part of a flexible display device including a controller according to another aspect of the present disclosure.

FIG. 21 is a diagram schematically illustrating a part of a flexible display device 500 including a controller according to another aspect. In description of the present aspect, features of the present aspect different from those of the foregoing aspects will be mainly described.

Referring to FIG. 21, the flexible display device 500 may include a controller 250 integrally connected by means of universal joints disposed to alternate with the fixing parts 140. For example, the controller 250 may be comprised of a plurality of separate wires 251 which may be connected to each other by means of the universal joints.

Since the plurality of wires 251 are connected to each other by means of the universal joints as described above, each of the wires 251 may rotate and freely move with respect to connecting portions. Due to this structure, the display panel 110 may realize not only inward and outward bending but also torsion.

Figure 22:
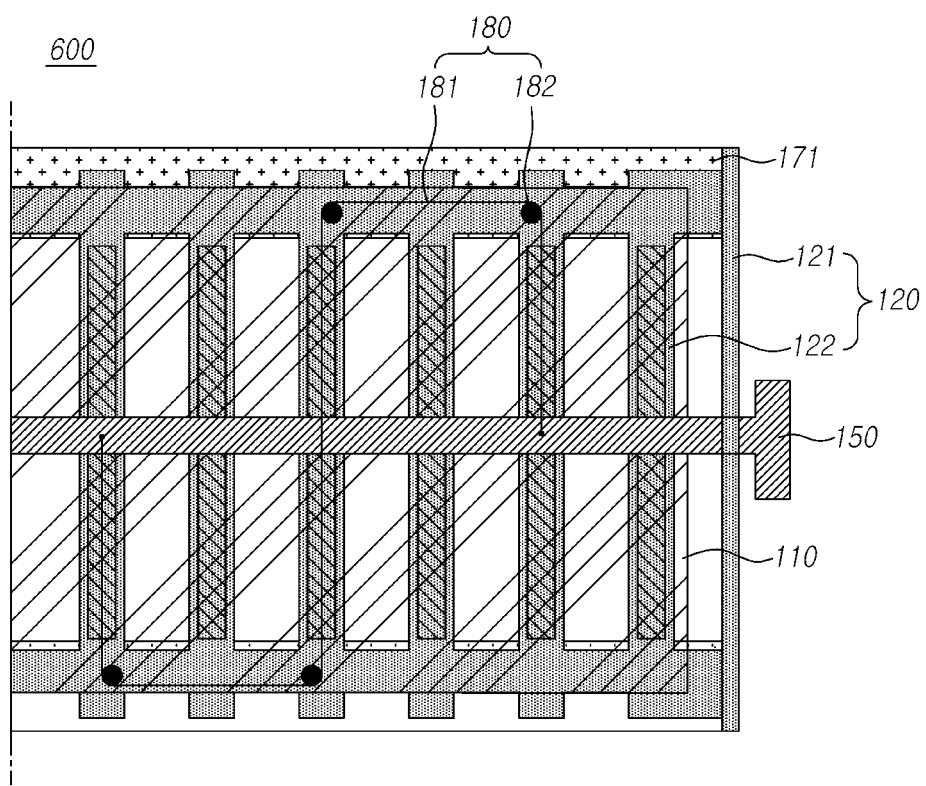
FIG. 22 is a diagram schematically illustrating a part of a flexible display device including an alignment unit according to an aspect of the present disclosure.

FIG. 22 is a diagram schematically illustrating a part of a flexible display device 600 including an alignment unit according to an aspect. In description of the present aspect, features of the present aspect different from those of the foregoing aspects will be mainly described.

Referring to FIG. 22, the flexible display device 600 may include an alignment unit 180 including a wire 181 and reels 182.

For example, both side portions of the controller 150 may be fixed to the rear surface of the frame 120 using the wire 181. Specifically, to the wire 181 may be wound on the reels 182 such that the position of the wire 181 is guided. At least two reels 182 may be disposed on one side of the rear surface of the frame 120 to be spaced apart from each other, and at least two reels 182 may be disposed on the other side of the rear surface of the frame 120 to be spaced apart from each other. Here, the number of the reels 182 and the distances between the reels 182 are not limited, and may vary depending on the size of the display panel 110.

Figure 23:
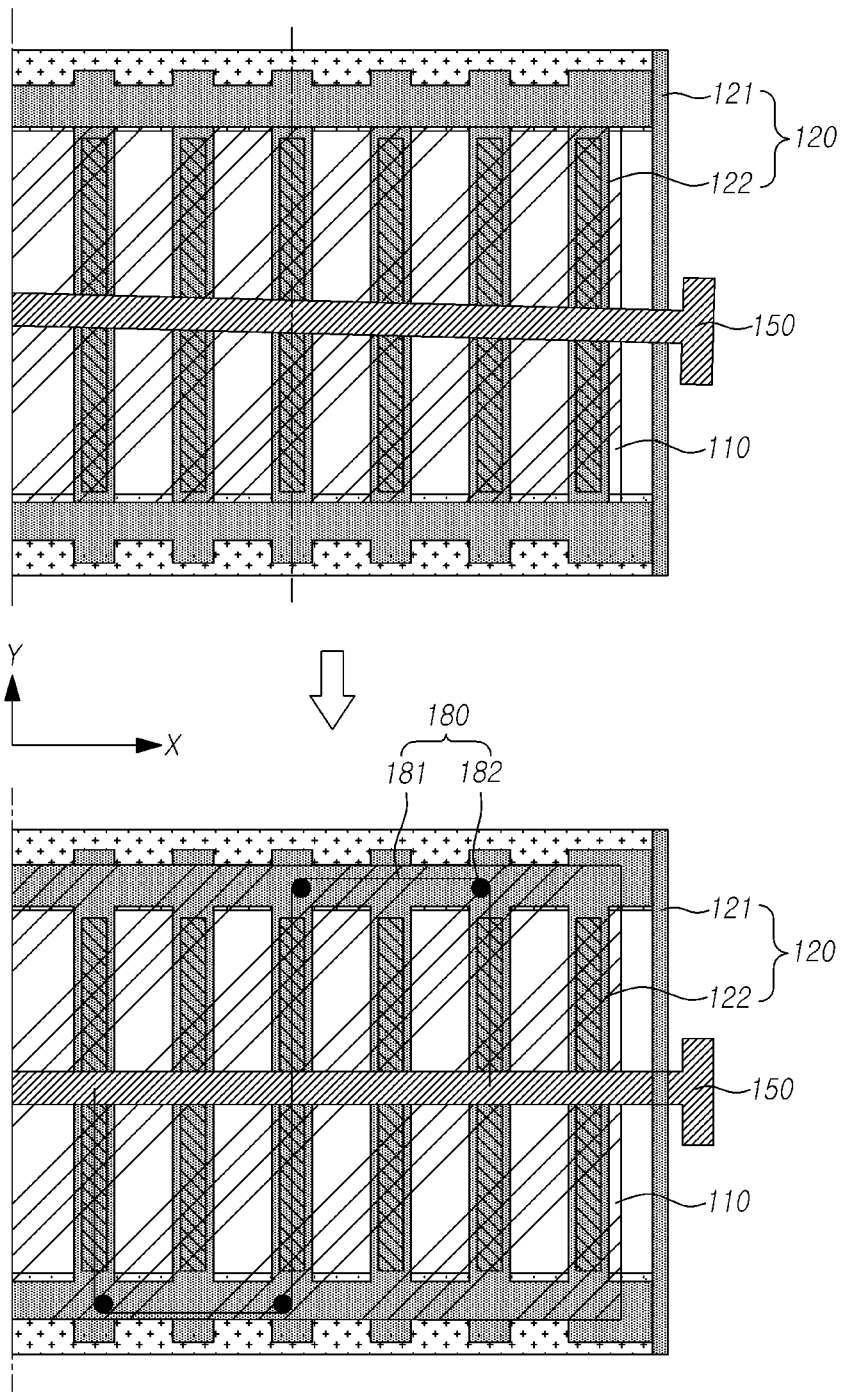
FIG. 23 is a diagram schematically illustrating controller alignment in a flexible display device without an alignment unit and in the flexible display device including the alignment unit illustrated in FIG. 22.

FIG. 23 is a diagram schematically illustrating controller alignment in a flexible display device without an alignment unit and in the flexible display device including the alignment unit illustrated in FIG. 22.

As illustrated in FIG. 23, due to the shape of the controller 150 elongated in the direction of the X axis in the figure, the controller 150 may be inclined during driving, and thus errors may occur at ends in the directions of the –X axis and the +X axis. Here, the direction of the –X axis indicates a downward direction with respect to the direction of the X axis in the figure, and the direction of the +X axis indicates an upward direction with respect to the direction of the X axis in the figure. That is, the controller 150 may be inclined in the direction of the Y axis with respect to the direction of the X axis in the figure or in the opposite direction. This inclining of the controller 150 may be increased when the flexible display device has a large size.

However, when both side portions of the controller 150 are fixed to the rear surface of the frame 120 using the alignment unit 180 as in the present aspect, the positions (i.e., the positions in the direction of the X axis in the figure) of both side portions of the controller 150 are guided, and the thus the inclining in one direction may be prevented.

Figure 24:
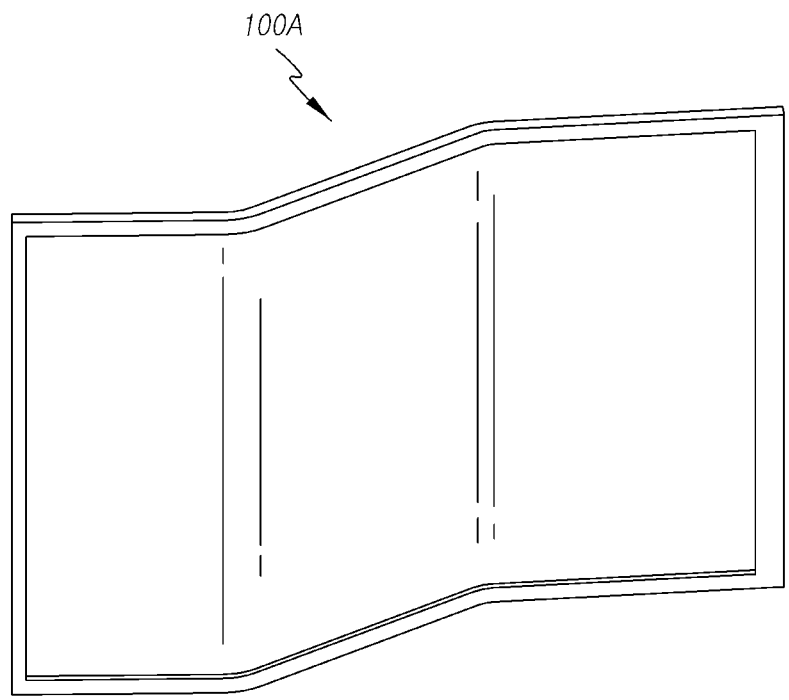
FIG. 24 is a perspective diagram schematically illustrating an example of a flexible display device according to various aspects the present disclosure.

FIG. 24 is a perspective diagram schematically illustrating an example of a flexible display device 100A according to aspects.

As illustrated in FIG. 24, the flexible display device 100A according to aspects may prevent the bent display panel 110 from being unbent through the coupling between the fixing parts 140 and the guide parts 130 as described above. Thus, the flexible display device 100A may maintain the bent structure without a separate mount for maintaining the bent shape.

Figure 25:
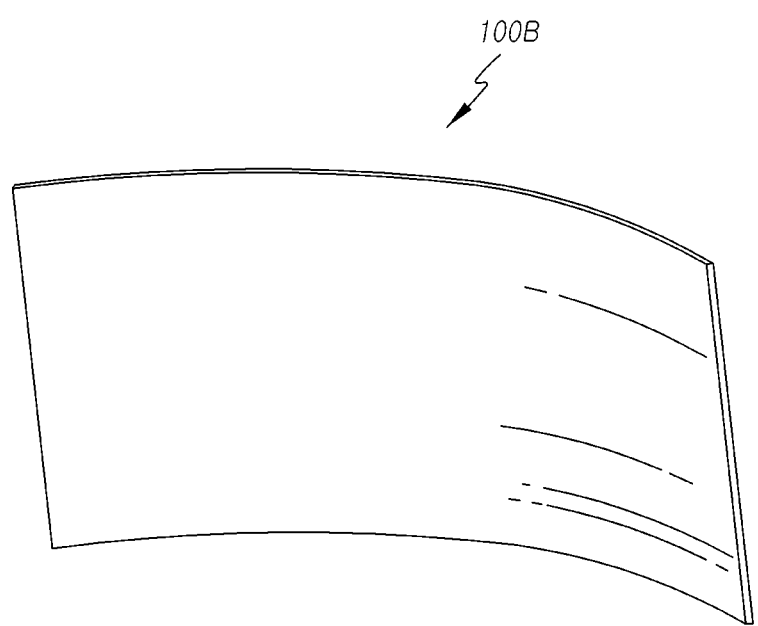
FIG. 25 is a perspective diagram schematically illustrating an example of a flexible display device according to other aspects of the present disclosure.

FIG. 25 is a perspective diagram schematically illustrating an example of a flexible display device 100B according to other aspects.

As illustrated in FIG. 25, the flexible display device 100B according to the present aspects may be freely bent or arched (or waved) as intended by the user through a plurality of bending axes BX formed in the display panel 110. As a result, it is possible to realize a curved shape by which the feeling of immersion is increased. In addition, since the bent display panel 110 may be prevented from being unbent by the coupling between the fixing parts 140 and the guide parts 130, the curved structure may be maintained without a separate frame for maintaining the curved shape.

Figure 26:
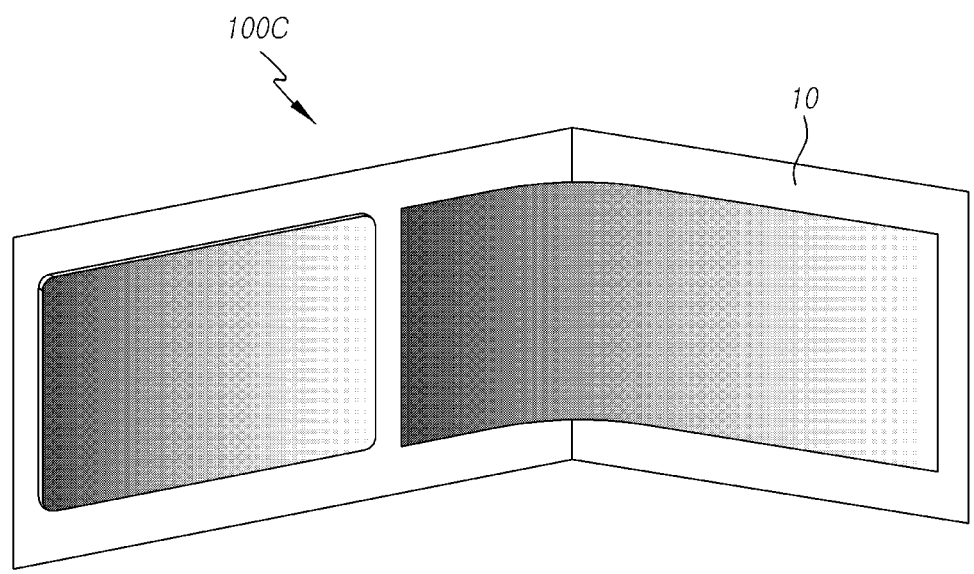
FIG. 26 is a perspective diagram schematically illustrating an example of a flexible display device according to other aspects of the present disclosure.

FIG. 26 is a perspective diagram schematically illustrating an example of a flexible display device 100C according to other aspects.

As illustrated in FIG. 26, the bending of the flexible display device 100C according to the present aspects may be changed and fixed according to the surrounding structure, thereby increasing space utilization. For example, when the flexible display device 100C is disposed on two walls 10 connected at a predetermined angle, the bending of the display panel 110 may be fixed according to the angle between the two walls 10 through the coupling between the fixing parts 140 and the guide parts 130 as described above. In this manner, the flexible display device 100C may be disposed on a non-flat surface.

The above-described aspects of the present disclosure will be briefly reviewed as follows.

Aspects may provide a flexible display device including: a display panel including at least one bending area bending about a bending axis; a frame supporting a rear surface of the display panel; a plurality of guide parts fixed to a rear surface of the frame; a plurality of fixing parts movably provided on the rear surface of the frame and selectively coupled to the plurality of guide parts; and a controller, the length of which is variable depending on the state of bending of the display panel, the controller being connected to the fixing parts to control movements of the fixing parts. When the fixing parts are coupled to the guide parts, the bent display panel may be prevented from being unbent.

The fixing parts may linearly move toward the guide parts to be coupled to the guide parts in response to rotational driving of the controller.

Each of the plurality of fixing parts may include: a movable member provided on the rear surface of the frame to be movable in a direction of the bending axis; and a coupling member provided on one surface of the movable member to be selectively coupled to a corresponding guide part among the plurality of guide parts.

Each of the plurality of guide parts may have the shape of a wheel having meshing teeth on an outer circumferential surface. The coupling member may have an inner hole allowing the guide part to be inserted thereinto and meshing teeth provided on an inner circumferential surface of the inner hole to engage with the meshing teeth of the guide part. One end of the controller connected to the movable member may be connected to the frame by means of an elastic member that is able to be tensioned and restored, such that when the coupling member is inserted into the guide part, restorative force of the elastic member is suppressed.

The controller may include a wire composed of a flexible material and elongated in a direction perpendicular to the bending axis and a pinion gear coupled to the wire. The movable member may include a rack gear elongated in the direction of the bending axis to engage with the pinion gear, and may move in one direction depending on a direction of rotation of the pinion gear to selectively couple the coupling member to the guide part.

The movable member may have guide holes provided on both sides to allow corresponding guide parts among the plurality of guide parts to be inserted thereinto.

Each of the plurality of fixing parts may include a first fixing part and a second fixing part disposed on one side and the other side of the frame, respectively, with the controller being disposed between the first fixing part and the second fixing part. The first fixing part and the second fixing part may be moved in opposite directions by the controller to couple the coupling member to the corresponding guide part.

The first fixing part may include a first rack gear connected to the controller to move toward the corresponding guide part provided on one side of the frame when the controller is rotated. The second fixing part may include a second rack gear disposed to face the first rack gear, with the controller being disposed between the first rack gear and the second rack gear. The second rack gear may be connected to the first rack gear by means of a spur gear to move toward a guide part among the plurality of guide parts provided on the other side of the frame when the controller is rotated.

A rail groove may be provided in the rear surface of the frame to be elongated in a direction of the bending axis, and a rail member may protrude from one surface of each of the plurality of fixing parts to be inserted into the rail groove. The protruding length of the rail member may be longer than the depth of the rail groove to define a distance between the fixing part and the frame.

The flexible display device may further include a restoration assembly restoring the display panel to an unbent state so that the display panel has a flat state when the fixing parts are decoupled from the guide parts.

The guide parts may be rotatably fixed to the rear surface of the frame. The restoration assembly may be elongated in a direction perpendicular to the bending axis, and may be elastically deformed by being stretched or contracted depending on the coupling state of the fixing parts and the corresponding guide parts.

The restoration assembly may be contracted to restore the display panel to the unbent state when the fixing parts are decoupled from the guide parts.

Each of the plurality of guide parts may have the shape of a wheel having meshing teeth on an outer circumferential surface. The restoration assembly may include: a keeper composed of a flexible material and having the shape of a rack gear having meshing teeth on one surface to engage with meshing teeth of the guide parts; and a winder connected to one end of the keeper to automatically withdraw or retract the keeper in response to external force applied to the display panel.

The meshing teeth of the guide parts or the meshing teeth of the keeper may have a tapered shape.

The restoration assembly may be configured to not interfere with the fixing parts.

The frame may include an anti-release part disposed on the rear surface thereof in an attachable-detachable manner to prevent the restoration assembly from being released.

The frame may include: a side frame surrounding a portion of a front surface and side portions of the display panel; and a plurality of support frames each having the shape of a bar elongated in the direction of the bending axis of the display panel and disposed on the rear surface of the side frame to be spaced apart from each other.

The side frame may include a hemispherical protrusion or a contact pad on a peripheral portion of a surface facing the display panel.

The controller may include a plurality of separate wires connected to each other by means of universal joints disposed to alternate with the fixing parts.

The flexible display device may further include an alignment unit fixing both ends of the controller to the rear surface of the frame using a wire.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure.

It will be apparent to those skilled in the art that various modifications and variations can be made in the flexible display device of the present disclosure without departing from the spirit or scope of the aspects. Thus, it is intended that the present disclosure covers the modifications and variations of the aspects provided they come within the scope of the appended claims and their equivalents.

What is claimed is:

1. A flexible display device, comprising:
   a display panel comprising at least one bending area bending with respect to a bending axis;
   a frame supporting a rear surface of the display panel;
   a plurality of guide parts fixed to a rear surface of the frame;
   a plurality of fixing parts movably provided on the rear surface of the frame and selectively coupled to the plurality of guide parts; and
   a controller connected to the fixing parts to control movements of the fixing parts, and the length of the controller is variable depending on a state of bending of the display panel,
   wherein the bent display panel is prevented from being unbent when the plurality of fixing parts are coupled to the plurality of guide parts.

2. The flexible display device according to claim 1, wherein the plurality of fixing parts linearly move toward the plurality of guide parts to be coupled to the plurality of guide parts in response to rotational driving of the controller.

3. The flexible display device according to claim 1, wherein each of the plurality of fixing parts comprises:
   a movable member provided on the rear surface of the frame to be movable in a direction of the bending axis; and
   a coupling member provided on one surface of the movable member to be selectively coupled to a corresponding guide part among the plurality of guide parts.

4. The flexible display device according to claim 3, wherein each of the plurality of guide parts has the shape of a wheel having meshing teeth on an outer circumferential surface,
   the coupling member has an inner hole allowing the plurality of guide parts to be inserted thereinto and meshing teeth provided on an inner circumferential surface of the inner hole to engage with the meshing teeth of the plurality of guide parts, and
   one end of the controller connected to the movable member is connected to the frame by means of an elastic member that is able to be tensioned and restored, such that when the coupling member is inserted into the plurality of guide parts, restorative force of the elastic member is suppressed.

5. The flexible display device according to claim 3, wherein the controller comprises a wire composed of a flexible material and elongated in a direction perpendicular to the bending axis and a pinion gear coupled to the wire, and wherein the movable member comprises a rack gear elongated in the direction of the bending axis to engage with the pinion gear, and moves in one direction depending on a direction of rotation of the pinion gear to selectively couple the coupling member to the guide part.

6. The flexible display device according to claim 3, wherein the movable member has guide holes provided on both sides to allow corresponding guide parts among the plurality of guide parts to be inserted thereinto.

7. The flexible display device according to claim 3, wherein each of the plurality of fixing parts comprises a first fixing part and a second fixing part disposed on one side and the other side of the frame, respectively, with the controller being disposed between the first fixing part and the second fixing part, wherein the first fixing part and the second fixing part are moved in opposite directions by the controller to couple the coupling member to the corresponding guide parts.

8. The flexible display device according to claim 7, wherein the first fixing part comprises a first rack gear connected to the controller to move toward the corresponding guide parts provided on one side of the frame when the controller is rotated, and the second fixing part comprises a second rack gear disposed to face the first rack gear, with the controller being disposed between the first rack gear and the second rack gear, the second rack gear being connected to the first rack gear by means of a spur gear to move toward a guide part among the plurality of guide parts provided on the other side of the frame when the controller is rotated.

9. The flexible display device according to claim 1, further comprising a rail member protruding from one surface of each of the plurality of fixing parts to be inserted into a rail groove provided in the rear surface of the frame to be elongated in a direction of the bending axis, wherein the protruding length of the rail member is longer than the depth of the rail groove so as to define a distance between the fixing part and the frame.

10. The flexible display device according to claim 1, further comprising a restoration assembly restoring the display panel to an unbent state so that the display panel has a flat state when the fixing parts are decoupled from the guide parts.

11. The flexible display device according to claim 10, wherein the plurality of guide parts are rotatably fixed to the rear surface of the frame, and the restoration assembly is elongated in a direction perpendicular to the bending axis, and is elastically deformed by being stretched or contracted depending on the coupling state of the plurality of fixing parts and the corresponding guide parts.

12. The flexible display device according to claim 10, wherein the restoration assembly is contracted to restore the display panel to the unbent state when the plurality of fixing parts are decoupled from the plurality of guide parts.

13. The flexible display device according to claim 10, wherein each of the plurality of guide parts has the shape of a wheel having meshing teeth on an outer circumferential surface, and wherein the restoration assembly comprises:

a keeper composed of a flexible material and having the shape of a rack gear having meshing teeth on one surface to engage with meshing teeth of the guide parts; and a winder connected to one end of the keeper to automatically withdraw or retract the keeper in response to external force applied to the display panel.

14. The flexible display device according to claim 13, wherein the meshing teeth of the guide parts or the meshing teeth of the keeper have a tapered shape.

15. The flexible display device according to claim 10, wherein the restoration assembly is configured to not interfere with the fixing parts.

16. The flexible display device according to claim 10, wherein the frame comprises an anti-release part disposed on the rear surface thereof in an attachable-detachable manner to prevent the restoration assembly from being released.

17. The flexible display device according to claim 1, wherein the frame comprises:

a side frame surrounding a portion of a front surface and side portions of the display panel; and a plurality of support frames each having the shape of a bar elongated in the direction of the bending axis of the display panel and disposed on the rear surface of the side frame to be spaced apart from each other.

18. The flexible display device according to claim 17, wherein the side frame comprises a hemispherical protrusion or a contact pad on a peripheral portion of a surface facing the display panel.

19. The flexible display device according to claim 1, wherein the controller comprises a plurality of separate wires connected to each other by means of universal joints disposed to alternate with the fixing parts.

20. The flexible display device according to claim 1, further comprising an alignment unit fixing both ends of the controller to the rear surface of the frame using a wire.

* * * * *